(No Model.) 3 Sheets—Sheet 3.
J. T. SMITH.
FLAX AND HEMP BRAKE.
No. 475,819. Patented May 31, 1892.
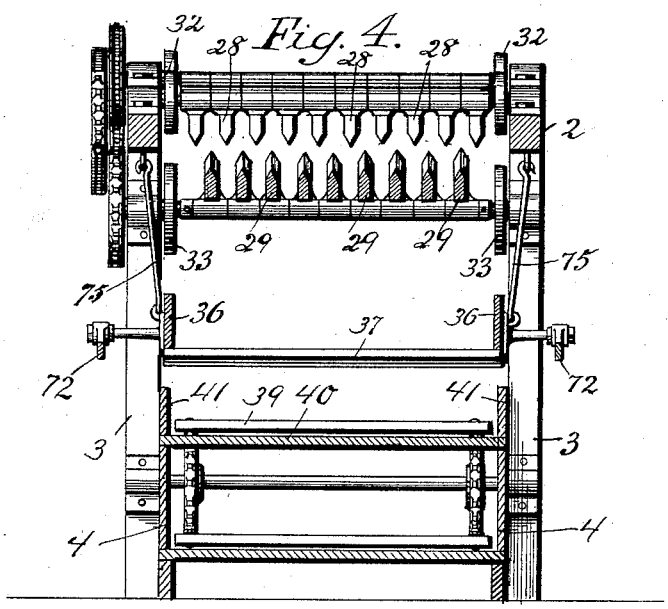
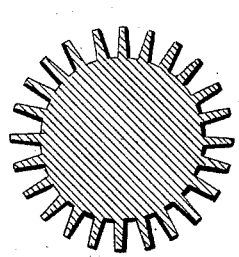
Fig.11.
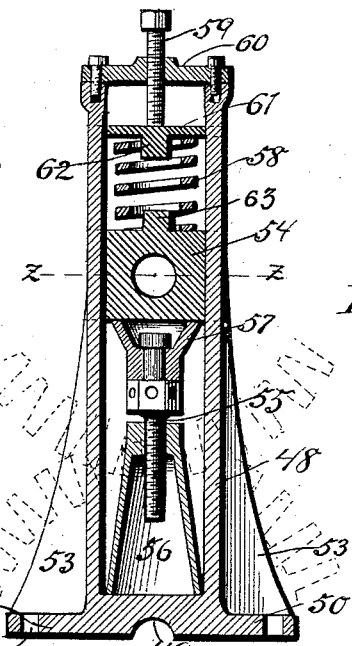
Fig.9.
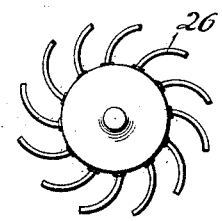
Fig.14.
Witnesses:
J. Jensen
O. G. Hawley
Inventor
John T. Smith
By Paul & Munn attys

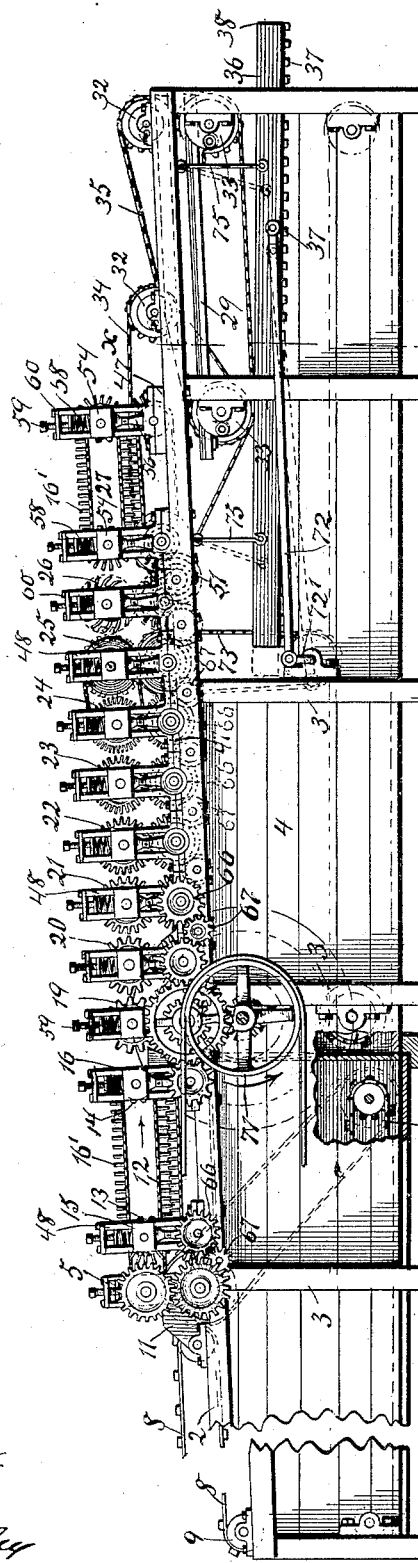

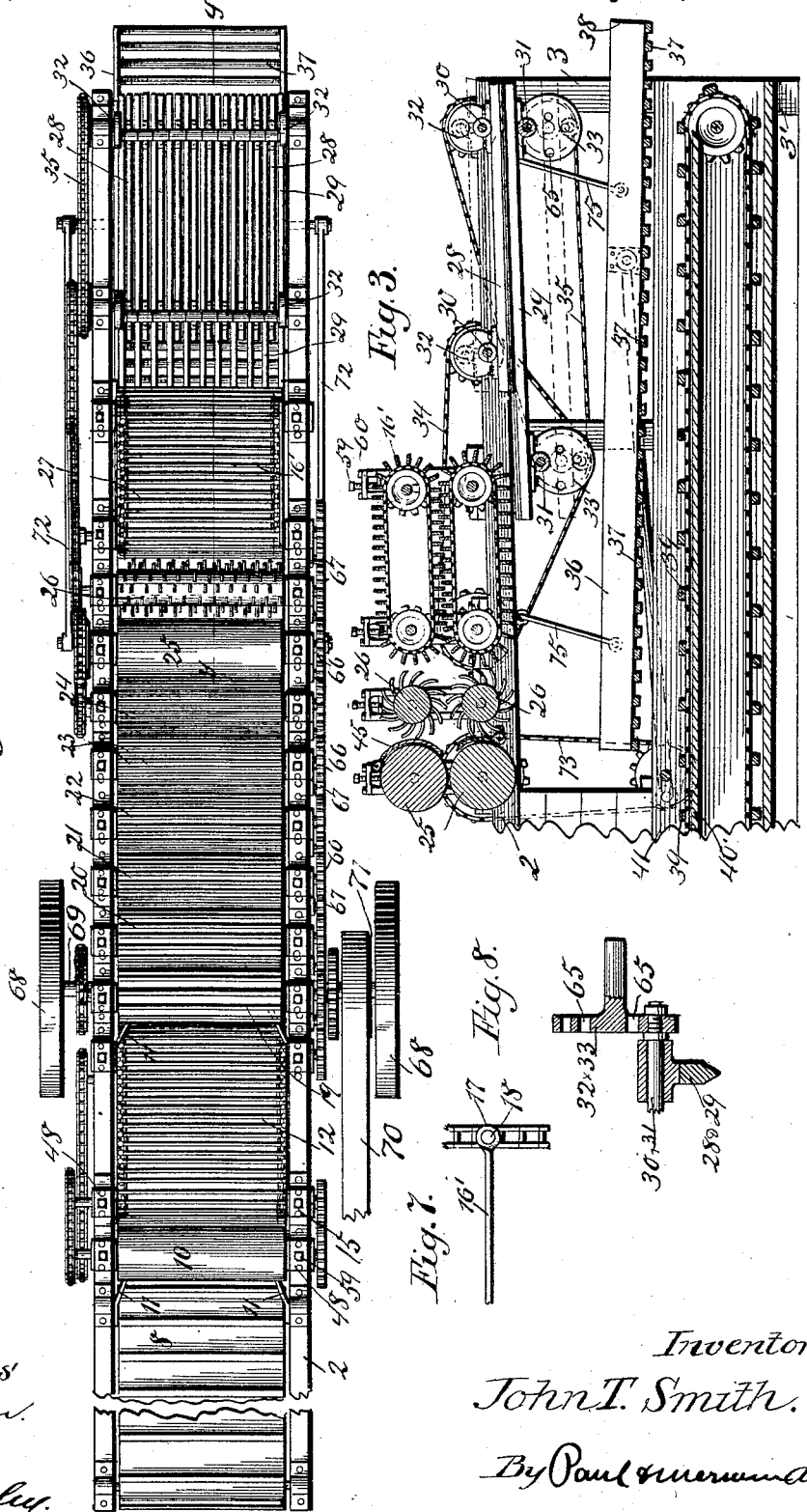

UNITED STATES PATENT OFFICE.

JOHN T. SMITH, OF HERON LAKE, MINNESOTA.

FLAX AND HEMP BRAKE.

SPECIFICATION forming part of Letters Patent No. 475,819, dated May 31, 1892.

Application filed March 23, 1891. Serial No. 385,995. (No model.)

*To all whom it may concern:*

Be it known that I, JOHN T. SMITH, of Heron Lake, in the county of Jackson and State of Minnesota, have invented certain Improvements in Flax and Hemp Brakes, of which the following is a specification.

My invention relates to that class of machines used in breaking the straw or stalks of flax, hemp, &c., to remove or detach the shives or pith portion from the fiber.

The object of the invention is to provide a machine of large capacity, a machine which will in one operation thrash and break the flax or hemp, so as to thoroughly detach all valuable seed from the stock before the straw is broken and the fiber drawn out, a machine which will draw out the fine threads or fibers and which will thoroughly clean the same and make it into a fine or coarse tow before leaving the machine, and a machine which will not break or shorten the fiber.

My invention consists in a self-feeding brake and thrashing-machine and means for thrashing, breaking, carding, drawing, pounding, and shaking the fibrous stock, and in various constructions and combinations hereinafter described, and particularly pointed out in the claims.

My invention will be more thoroughly understood by reference to the accompanying drawings, in which—

Figure 1 is a side elevation of a machine embodying my invention. Fig. 2 is a plan view thereof. Fig. 3 is an enlarged section on the line *y y* of Fig. 2. Fig. 4 is an enlarged transverse section on the line *x x* of Fig. 1. Fig. 5 is a sectional view showing my machine in use as a thrasher. Figs. 6, 7, and 8 are details. Fig. 9 is a vertical section of one of the adjustable pillow-blocks. Fig. 10 is a horizontal section on the line *z z* of Fig. 9. Fig. 11 is a cross-section of one of the brake-rolls. Figs. 12 and 13 show modifications thereof. Fig. 14 is an enlarged end view of one of the carding-rolls.

As shown in Figs. 1, 2, 3, 4, and 5, the smooth, brake, and carding rolls making up the main body of the machine are supported upon the bed-timbers 2, which are in turn braced and supported by the standards 3, tied across the bottom by braces 3′. The sides of the machine are closed by boards 4. As shown in Fig. 1, the feeder end of the machine is for convenience of representation cut away. The full length of this end of the machine is indicated in Fig. 5, the smooth-roll pillow-blocks 5 therein corresponding to those similarly numbered in Fig. 1. In Fig. 5 the parts are reversed for use in thrashing. Ordinarily the full distance from the dividing-partition 6 to the end 7 is occupied by the long table carrier or conveyer 8 (shown in Fig. 1) and passing over the end pulley 9. This carrier varies in length from thirty to one hundred feet, according to the predetermined capacity of the machine. The arrangement is such that the loaded wagons drive directly alongside the carrier and the flax, hemp, or other material is pitched directly upon the conveyer-table. It will be seen that from four to a dozen or even more wagons may be unloaded at the same time. By means of the carrier 8 the stock is automatically fed into the smooth rolls 10. Shields 11 serve to prevent the spreading of the light straw or other stock. From the smooth rolls, which serve to crush the flax-seed balls, the stock passes into the rattle 12, made up of two endless slat-conveyers running over the sprockets 13 and 14, supported by shafts having bearings in the pillow-blocks 15 and 16. The slats 16 of these two conveyers are set on edge and are secured to the sprocket-chain by eyes 17, through which pass rivets or bolts 18, as shown in Fig. 7. After passing through the rattle 12 the stock passes between the successive pairs of corrugated rolls 19, 20, 21, 22, 23, and 24. Each set or pair of rolls following the roll 19 is provided with a greater number of corrugations than the roll preceding it, so that the brake grows finer and closer toward the forward end of the machine. All of these brake-rollers revolve at the same surface speed and the teeth or ribs thereof are so rounded that they do not cut or break the long fiber. From the last brake-roll 24 the stock passes in between the forward pair of smooth rolls 25, by which the stock is flattened out into a thin sheet and passed into the carding-rolls 26, which run at a higher rate of speed than the smooth rolls, and consequently draw out the fibers of the stock. From the carding-rolls 26 the stock next passes in between the slats 16′ of the forward rattle device 27. This rattle in turn revolves faster than the carding-rolls, thereby forcibly pulling the stock through the cards and thoroughly stripping the shives off of the same. By this time the stock is reduced to a fine tow, but still contains some fine pieces of the woody portions or shives. In order to clean this thoroughly and to remove all of the valueless parts, the tow as it falls from the forward end of the rattle is taken up and subjected to a pounding and shaking process by the device which I call the "pounder." The pounder consists of the longitudinal bars 28 and 29, arranged on the cross or crank shafts 30 and 31 and actuated by the crank-wheels 32 and 33, driven by sprocket-chains 34 and 35. These longitudinal rods are arranged, as shown in Fig. 4, so as to mesh with one another. As the crank-wheels are revolved the two racks made up of the rods 28 and 29 are thrown together and thence forwarded and separated and then thrown back together again. The lower rods 29 are longer than the rods 28 and extend back, so as to take up the stock falling from the rattle 27. This stock is thence pitched forward and subjected to a thorough pounding and thrashing to shake out the waste portions and stir up the tow. Owing to the longitudinal arrangement of the bars of the pounder the fiber is not broken. All of the fine tow falling through the rattle or the cards or the pounding device is caught by the vibratory shaker 36, having the high sides and the transverse slats or bars 37. This shaker is slanted slightly forward, so that the tow is delivered in a clear state from the end 38 thereof. Any suitable receptacle may be provided to receive the stock. As shown, a long conveyer 39, made of link chains and cross-slats, extends along the bottom of the machine in the trough formed by the table or bottom 40, having the sides 41. This conveyer carries away all of the waste portions of the stock, which may be conducted into the fuel-room to be burned beneath the boiler or to a waste pile.

In the bottom of the feeder end of the machine I provide the second conveyer 43, adapted to carry away all of the seed which is thrashed out as the stock passes through the smooth rolls 10 and the rattle device 12, working in connection therewith. When the device is used as a thrashing-machine, this rattle 12 (shown in Fig. 1) is placed on the other side of the smooth rolls 10 by moving the pillow-blocks to such position and bolting them to the frame, the conveyer 8 having been previously removed. A short conveyer 44 is then substituted in place of the rattle 12, so as to feed the stock into the smooth rollers from the other direction. The pounding device and the shaker 36 are removed from the front extremity of the machine and hung in the rear thereof, as shown in Fig. 5. With this arrangement the straw or stock is thrown upon the short conveyer 44, extending between the smooth rolls 10 and the pillow-blocks of the first pair of corrugated rollers 19, which rolls and all the other machinery forward thereof are shown out of gear and motionless while the thrashing machinery (shown in Fig. 5) is in use. The straw with the seed passes into the smooth rolls 10, where the seed-pods are broken. From the smooth rolls the straw passes between the transverse slats of the rattle 12, which thoroughly thrash and strip out all of the seed from the straw. This seed falls upon the conveyer 43 and is carried thereby into a suitable receptacle. The straw passes into the pounding-racks, made up of the bars 28 and 29, and from thence down onto the shaker 36, both of which tend to more thoroughly separate the seed from the straw. The straw, being unbroken, passes off of the shaker 36 to be rattled preparatory to breaking or to be otherwise used.

The straw as it passes through the smooth rolls 10 or 25 is apt to wind about the same. To prevent this, I provide the curved shields 45, standing close to the rolls and preferably adjustable to and from the same. The brake-rolls, instead of being provided with straight longitudinal ribs or corrugations, may be provided with spirally-inclined ribs 46 (shown in Fig. 12) or with ribs 47, having the ogee curves, as shown in Fig. 13. Only slight advantage, however, follows from such constructions, and I therefore prefer the straight-ribbed rolls shown in Fig. 2 and a detail cross-section of which is shown in Fig. 11.

Where it is desired to pass a large bulk of straw through the machine, it has been found necessary to have the rolls of each pair farther apart than when only a light feed is being maintained. In order to conveniently adjust the vertical distance between the rolls, I employ the adjustable pillow-blocks shown in detail in Figs. 1, 9, and 10. As shown in Fig. 1, the lower box 47 is set on the sill-beam 2, while the foot of the standard 48 is provided with a semi-cylindrical groove 49, adapted to receive the top of the shaft supporting the roller. Broad feet 50 are provided on the standard 48, and these are bolted upon the bed-plate 47 by means of bolts 51, passing through the holes 52 in the feet and lower box. Webs 53 serve to strengthen and brace the upright sides of the standard 48. The upper bearing 54 is in the form of a solid or horizontally-divided block 54, adapted to receive the end of the upper roller-shaft. The block 54 is adjustably supported by the jack-screw made up of the vertical shaft 55, supported by the base-block or cone 56 and free to turn in the inverted-cup sleeve 57, upon which the block 54 rests. The block 54 is held down solidly upon its support by a strong coiled spring 58, the tension of which may be varied by means of the set-screw 59, passing through the cap-plate or bridge 60, bolted across the upper end of the standard's sides. The lower end of the set-screw 59 engages the movable plate 61, having a lug 62, which, with the lug 63 on the top of the block 54, holds the coiled spring in place. The sizes of the parts are such that by removing the cap-plate 60 the block 54 may be slipped up from between the sides of the standard. Lugs or shoulders 64 on the block 54 engage edges of the standard and prevent longitudinal movement of the block.

The adjustment of the throw of the pounder-racks may be varied by means of the extra openings 65 in the crank-wheels 32 or 33 and in which the ends of the crank-rods 30 31 are secured, as shown in Fig. 8. By this adjustment the closeness of approach between the rods of the upper and lower racks may be varied.

It is obvious that any system of driving the rolls, conveyer-feeders, trough-conveyers, and other parts of the machine may be used. Preferably, however, I connect the smooth rolls, brake-rolls, cards, and rattles together by the gear and pinion wheels 66 67, &c., as shown in Figs. 1 and 2. One or two large fly-wheels 68 are provided on the main drive-shaft 69 to give steadiness to the movement of the machine. Power is imparted to this shaft 69 through the drive-belt 70, passing over the pulley 71 thereon. Suitable belts and sprockets are used for driving the pounders, shakers, and conveyers. Long pitman-rods 72 extend from pivotal connections on the sides of the shaker-blocks 36 to cranks 72', driven by a suitable belt 73, passing over the sprocket on the ends of the crank-shaft. In order to raise both ends of the pounding-racks together, sprocket-wheels are provided on the forward and rear crank-shafts and sprocket-chains passed over the same, so as to operate the crank-shafts simultaneously, thereby giving the longitudinal bars of the two racks a parallel motion. The shaker-box 36 is hung from the under sides of the bed-timbers 2 by hooked links 75. Sufficient space is gained for the pounding-racks and the shaker beneath the forward ends of the sill-beams by raising the same somewhat, as shown in Fig. 1. It is obvious, however, that with slight alterations the sill-beams may be made to occupy any angle to the horizontal or lie on a level, as desired. When thrashing hemp, it is sometimes thought desirable to substitute in place of the smooth rolls described corrugated rolls.

The advantages of my machine lie in its adaptability for work on any class of stock or to thrashing or breaking; in the large and automatic feed, adapting the machine for very heavy work; in the pounding and shaking devices, whereby all of the loose shives or woody parts which have been loosened from the stalks and straw are sifted out of the same before the long fiber or tow leaves the machine, and in the fact that it does not shorten the fiber.

Having thus described my invention, I claim as new and desire to secure by Letters Patent—

1. The combination, in a machine of the class described, of the frame with the long conveyer 8, as described, smooth thrashing-rolls 10, and a series of brake-rolls, the corrugations of which rolls increase in number toward the front of the machine, the rolls 70 having the largest and fewest corrugations being nearest the rolls 10, substantially as described.

2. The combination, in a machine of the class described, of a series of pairs of longitudinally-corrugated brake-rolls with means for feeding the stock into the first pair of brake-rolls, the carding-rolls 26, the pair of smooth rolls 25, interposed between the last pair of brake-rolls and said carding-rolls to gather the stock from the brake-rolls and feed the same to the carding-rolls in a thin compact sheet, the rattle device 27, arranged to receive the stock from the carding-rolls, and means for revolving said several rolls and for revolving said rattle device more rapidly than the carding-rolls, whereby the same is caused to strip or peel the shives from the fiber, substantially as described.

3. The combination, in a brake, of the brake-rolls with the smooth rolls 25, carding-rolls, the rattle 27, and pounding and shaking devices, substantially as described.

4. The combination, with the conveyer, of thrashing-rolls, a rattle, the pounding device made up of longitudinal rods 28 and 29, a shaker 36, provided beneath the same, and a conveyer provided in a trough thereunder, substantially as described.

5. In a brake, the combination, with the frame provided upon suitable supports, of the long conveyer 8, the thrashing-rolls, the rattle 12, a series of graded brake-rolls, flattening-rolls 25, cards 26, the rattle device 27, and the pounding and shaking devices, substantially as described.

6. The combination, with the frame, of a long conveyer 8, the graduated pairs of brake-rolls, smooth rolls 25, carding-rolls 26, the rattle 27, the pounding-racks made up of longitudinal rods 28 and 29, arranged upon the crank-shafts, and the shaker 37, substantially as described.

7. The combination, with the standard 48, adapted to be bolted upon the sill or frame, of the block 54, slidably secured between the upright sides of said standards, the jack-screw arranged beneath said block, the coiled spring 58, provided above the same, and means for adjusting the tension thereof, substantially as described.

8. The combination, with the sill-beams and supports therefor, of thrashing and brake rolls, a feed-conveyer, the power-shaft, fly-wheels in connection therewith, the trough arranged beneath said rolls, and the conveyer 39, provided therein, substantially as described.

9. The process of preparing flax or hemp fiber, which consists in first crushing the stock, then transversely breaking the same, but maintaining the fiber, then carding the fiber to remove the shives, then subjecting the fiber to a longitudinal pounding, and finally to a longitudinal shaking, substantially as described.

10. The combination, in a flax or hemp brake, of a feeding device with a pair of thrashing and crushing rolls between which said feeding device is adapted to deliver the stock, the surfaces of said rolls being cylindrical and smooth, pairs of corrugated brake-rolls arranged one pair in advance of the other and to receive the crushed stock from said smooth rolls, said pairs of brake-rolls being three or more in number and the corrugations of each pair being closer or finer than of the preceding pair, a single pair of carding-rolls, the carding-rolls arranged in front of the last pair of brake-rolls, the stock thereof being fed between the carding-rolls, and means for revolving all of said brake-rolls at the same speed and for rotating the carding-rolls more rapidly than said brake-rolls, substantially as and for the purpose specified.

In testimony whereof I have hereunto set my hand this 14th day of March, 1891.

JOHN T. SMITH.

Witnesses:
LOUIS F. LAMMERS,
J. C. MOTT.